US006850363B1

(12) United States Patent
Wendenburg et al.

(10) Patent No.: US 6,850,363 B1
(45) Date of Patent: Feb. 1, 2005

(54) SYSTEM FOR INTRODUCING OPTICAL TWEEZERS AND/OR A TREATMENT BEAM INTO A LASER SCANNING MICROSCOPE

(75) Inventors: Ronald Wendenburg, Jena (DE); Anja Michelmann, Jena (DE); Karl Otto Greulich, Jena (DE); Shamci Monajembashi, Heidelberg (DE); Volker Uhl, Enzersdorf (AT)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/869,951
(22) PCT Filed: Nov. 2, 2000
(86) PCT No.: PCT/EP00/10808
  § 371 (c)(1),
  (2), (4) Date: Dec. 10, 2001
(87) PCT Pub. No.: WO01/35150
  PCT Pub. Date: May 17, 2001

(30) Foreign Application Priority Data

Nov. 10, 1999 (DE) .......................................... 199 54 933

(51) Int. Cl.[7] .............................................. G02B 21/06
(52) U.S. Cl. ....................................... 359/385; 250/251
(58) Field of Search ................................ 359/368, 385, 359/389, 234, 235; 250/251

(56) References Cited

U.S. PATENT DOCUMENTS 4,289,378 A   9/1981 Remy et al.
4,934,799 A   6/1990 Chu
5,022,743 A * 6/1991 Kino et al. ................. 359/235
5,308,976 A * 5/1994 Misawa et al. ............. 250/251
5,689,109 A * 11/1997 Schutze ...................... 250/251
5,952,651 A * 9/1999 Morito et al. .............. 250/251
6,075,643 A * 6/2000 Nonoda et al. ............. 359/372
6,317,258 B1 * 11/2001 Watanabe ................... 359/368

FOREIGN PATENT DOCUMENTS

| DE | 42 31 004    | 3/1994  |
| DE | 196 16 216   | 10/1997 |
| DE | 198 01 139   | 7/1999  |
| EP | 0 092 090    | 10/1983 |
| EP | 0 486 732    | 5/1992  |
| EP | 0 679 325    | 10/1997 |
| WO | WO 94/16543  | 7/1994  |

OTHER PUBLICATIONS

XP004095273—Journal of Biotechnology 52 (1996) 65–73 "Laser Manipulation and UV Induced Single Molecule Reactions of Individual DNA Molecules" Hoyer, et al.
XP000690365—Applies Optics, US, Optical Society of America (Apr. 1997) 2107–2113 "Design For Fully Steerable Dual–Trap Optical Tweezers" Faellman, et al.

* cited by examiner

Primary Examiner—Mark A. Robinson
(74) Attorney, Agent, or Firm—Reed Smith LLP

(57) ABSTRACT

An arrangement for coupling at least one beam of optical tweezers for trapping particles and/or a treatment beam into a microscope beam path, preferably in a laser scanning microscope, wherein means are provided for changing the position of the beam focus of the optical tweezers and/or of the treatment beam in a freely adjustable manner for purposes of changing the focal position of the microscope.

5 Claims, 2 Drawing Sheets

SYSTEM FOR INTRODUCING OPTICAL TWEEZERS AND/OR A TREATMENT BEAM INTO A LASER SCANNING MICROSCOPE

CROSS-REFERENCE TO RELATED APPLICATIONS

This application claims priority of PCT application Ser. No. PCT/EP00/10808, filed. Nov. 2, 2000 and German application Serial No. 199 54 933.8, filed Nov. 10, 1999, the complete disclosures of which are hereby incorporated by reference.

BACKGROUND OF THE INVENTION a) Field of the Invention

The invention enables spatial fixation of microscopic objects in laser scanning microscopes, also during the displacement of the object plane, for example, when recording an image. Therefore, moving objects can also be imaged sharply.

b) Related Background

Optical tweezers have proven to be an important work tool for a range of biological work techniques. Expanded experimental possibilities can be anticipated due to the combination of laser scanning microscopes with laser microtechniques.

LSM recordings of moving objects, above all in the interior of unopened cells, often do not result in satisfactory images because many subcellular structures move during the scanning time. Ideally, the optical tweezers can be used for careful (vital) fixation. Further, a spatially defined displacement of fixed objects is possible with the optical tweezers. Application examples for the use of compensated optical tweezers in the laser scanning microscope are the examination of organelles, for example, chloroplasts, or the determination of objects which are moved by motor proteins. In the latter case, it is even possible under suitable conditions to take energy measurements. In principle, moving objects, for example, particles in suspension or determined organelles, can not be imaged sharply without being fixated by compensated optical tweezers.

Optical tweezers which are coupled in through the objective have their focus in the object plane. When there is a parallel displacement of the object plane due to the three-dimensional image recording process (scanning), the focus of the optical tweezers is also displaced. As a result, objects that are held by the optical tweezers are likewise displaced. However, this is undesirable during image recording. Therefore, the displacement of the object plane must be compensated by a suitable device in the beam path of the optical tweezers.

One aspect of the present invention is to fulfill a need in laser scanning microscopes of different manufacturers whenever the optical tweezers are coupled in through the objective and the third dimension is made accessible during image recording by the displacement of the objective or object stage or by another method which displaces the focus of the optical tweezers relative to the specimen.

When optical tweezers are coupled into an inverted microscope via a second high-aperture objective which couples in the optical tweezers from the other side of the specimen (K. Visscher, G. J. Brakenhoff, "Single Beam Optical Trapping Integrated in a Confocal Microscope for Biological Applications", Cytometry 12:486–491)), a compensated movement of the optical tweezers is rendered superfluous. However, the specimen must be located between two glass coverslips for this purpose and may not exceed a certain thickness. Further, this type of in-coupling limits conventional microscope applications because the objective for the optical tweezers is placed at the location of the transmitted light beam path in the inverted microscope. Moreover, there is no longer unlimited free access to the specimen from above, which makes applications with microinjection devices or temperature regulating devices, for example, very difficult, if not impossible. This is also true for constructions in which optical fixation of particles is carried out by glass fibers which are provided with microlenses and which are guided directly onto the specimen. In addition, problems arise with respect to the sterility of the specimen because the glass fibers must be immersed in thicker liquid layers when particles are to be fixated on the underside of the liquid. An aspect of the invention is to address these problems as well.

SUMMARY OF THE INVENTION

In accordance with the invention, an arrangement for coupling at least one beam of optical tweezers for trapping particles and/or a treatment beam with a microscope beam path, preferably in a laser scanning microscope comprising means for changing the position of the beam focus of the optical tweezers and/or of the treatment beam in a freely adjustable manner for purposes of changing the focal position of the microscope.

DESCRIPTION OF THE PREFERRED EMBODIMENTS

Figure 1:
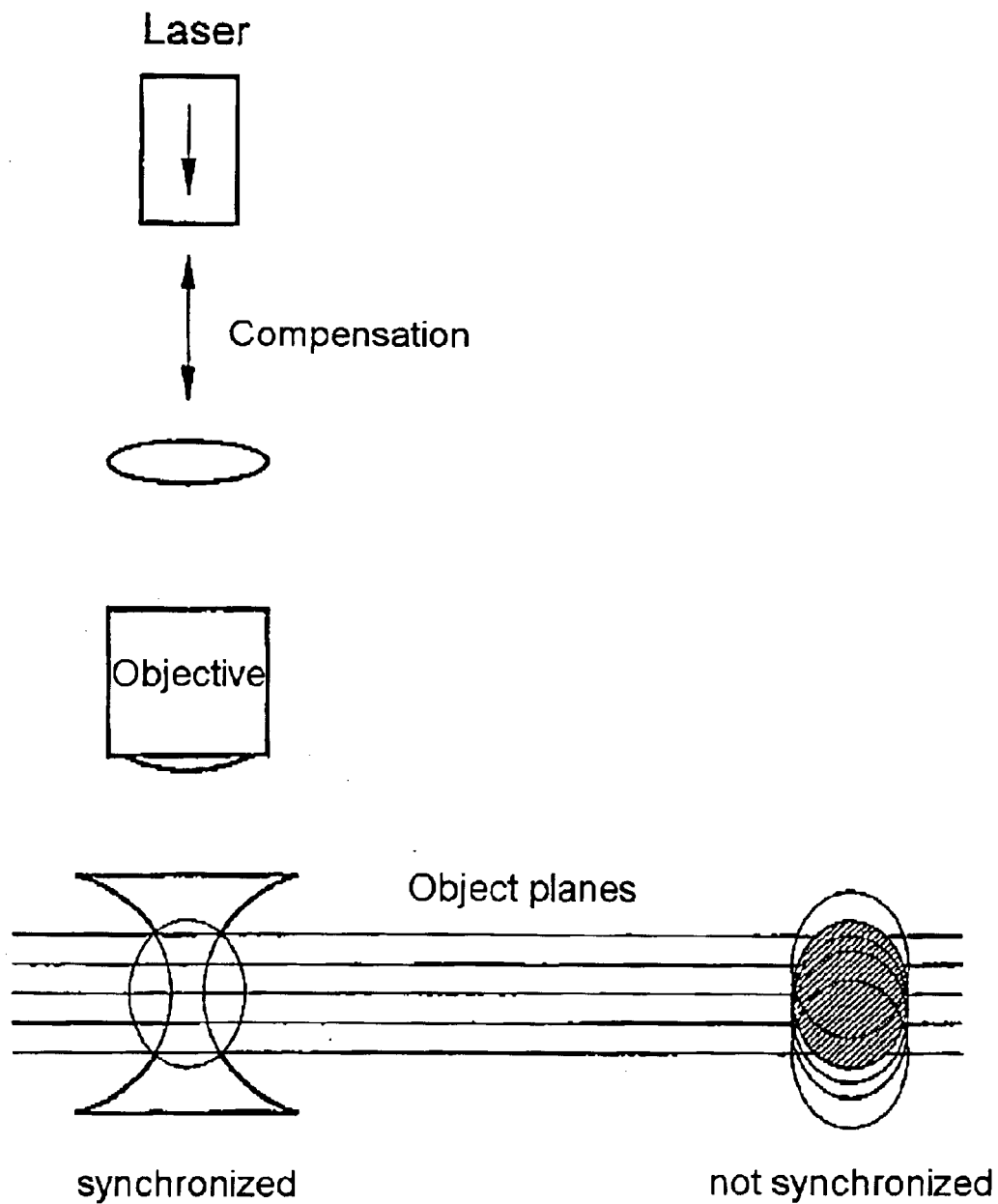
FIG. 1 is a schematic illustration of the operation of the invention.

In the construction which is relevant for the invention, the optical tweezers are guided through the microscope objective into the object plane. They are adjusted in such a way that microscopic particles located in the object plane are fixed, that is, the focus of the optical tweezers lies in the object plane. However, in three-dimensional image recording through a laser scanning microscope, the object plane must be displaced in parallel in order to access the third dimension projecting out of the object plane. Accordingly, the focus of the optical tweezers is also displaced, which leads to an unwanted displacement of the fixated particles. Three-dimensional objects that are held by the optical tweezers can not be recorded in three-dimensional resolution without compensating for this displacement. Compensation of the displacement of the object plane, hereinafter referred to as z-compensation, comprises variable optical elements which are inserted into the beam path of the optical tweezers and compensate for the movement of the object plane. The z-compensation causes a compensating movement of the optical tweezers which takes place simultaneous with the movement of the object plane, so that the position of the fixated object in the specimen is maintained.

The compensation is achieved via an electromechanically displaceable optical element in the in-coupling system of the optical tweezers. The exact position of the object plane is taken from the control electronics of the laser scanning microscope during the image recording process. Correspondingly, the displaceable optical element in the in-coupling system of the optical tweezers is moved in a computer-controlled manner so that the position of the fixated object relative to the specimen is maintained. In principle, it is not necessary to determine the position of the object plane from the control electronics of the laser scanning microscope since the position of the relevant optical elements can also be detected electromechanically or optically. However, this entails high expenditure.

When the beam path for the optical tweezers from the laser to the microscope is effected via light guides, the z-compensation can be combined with the microscope-side arrangement for holding the light guide. This results in a compact unit with a minimum of optical elements.

It is also possible to carry out the z-compensation manually. For this purpose, the object to be examined is scanned in different x-y sections. The object plane is displaced between the sections by the laser scanning microscope. Before recording the next section, the position of the focus of the optical tweezers is returned to the starting point by manual displacement of the additional optical element located in the beam path of the optical tweezers. This process is repeated for every x-y section. However, the computer-controlled electromechanical displacement of the compensation element described above saves times during the three-dimensional image recording, which can be of decisive importance in case of ephemeral preparations. However, the z-compensation, per se, is to be patented independent from its technical application.

If several objects moving in liquid are to be examined, all of them must be fixated by optical tweezers. The z-compensation described herein also allows the coupling in of a multitrap, as it is called, of optical tweezers in which one or more laser beams are directed to a plurality of objects for fixating. This can also be carried out in that a beam is directed alternately to a plurality of objects by means of a scanner mirror at high frequency in such a way that these objects remain fixated even when the laser beam does not permanently irradiate the corresponding object.

In the same way as the optical tweezers, a laser microbeam can also be coupled in so as to be compensated (a laser microbeam is a short pulse laser beam which is coupled into a microscope for purposes of micro-material treatment). Accordingly, the same optics as those used for the optical tweezers can be used for coupling in the laser microbeam. A z-compensated laser microbeam allows precise material treatment during image recording, for example, in order to examine in detail the interaction between light and material.

Figure 2:
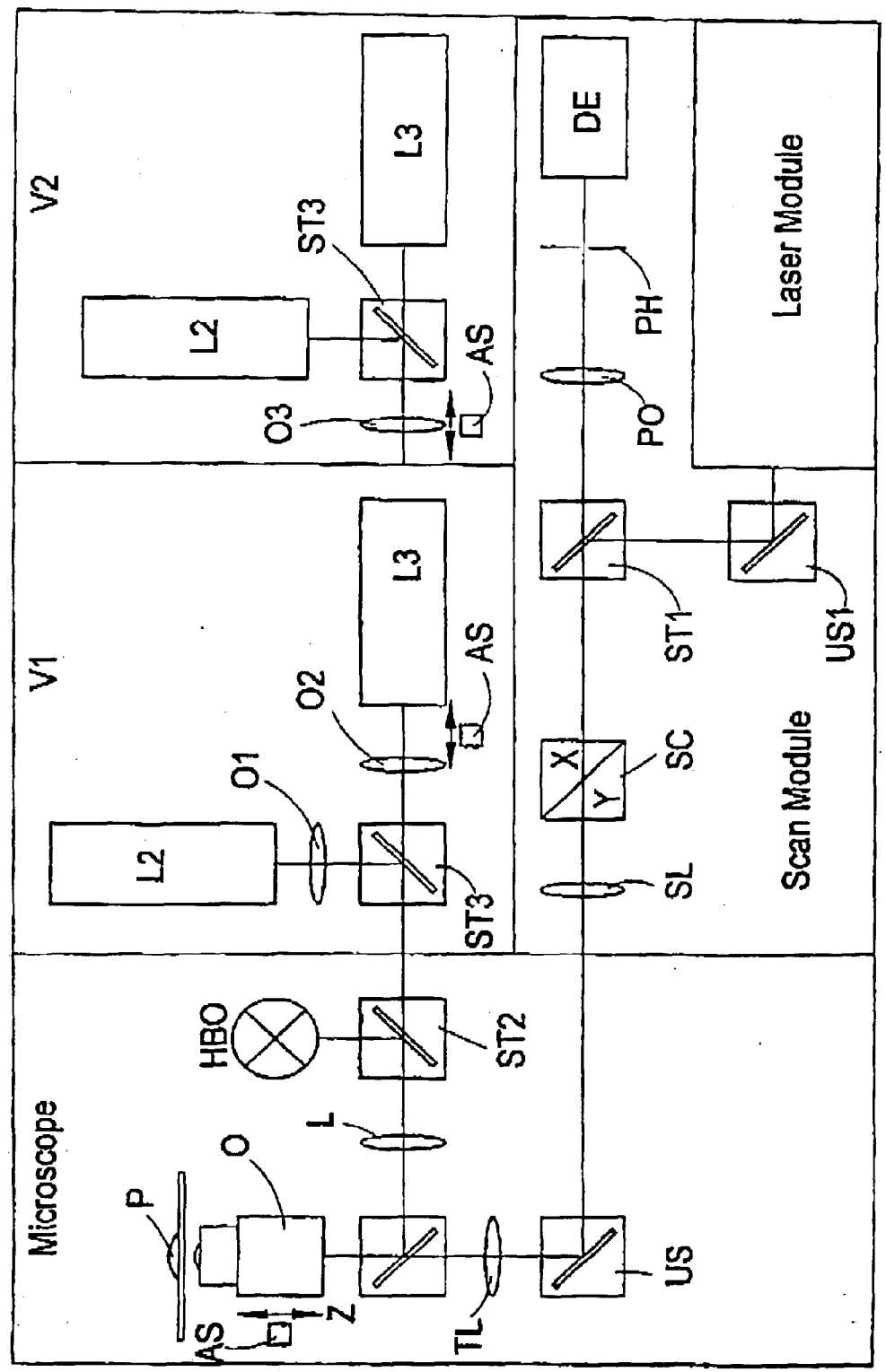
FIG. 2 shows application in a microscope such as a laser scanning microscope.

FIG. 2 shows a microscope beam path with a specimen P, an objective O and a tube lens TL. By means of a deflecting mirror US, a laser beam L1 which scans the specimen P in x/y direction is coupled in via a scan lens SL, X/y scanner SC, deflecting mirror US1 and dichroic beam splitter ST1.

Vertical adjustment of the beam focus in the specimen is carried out by displacing the objective O in Z-direction via a control unit AS, so that the specimen can be scanned at different Z-positions.

The beam coming from the specimen reaches a detector unit comprising pinhole optics PO, pinhole PH and detector DE on a reverse path via the beam splitter ST1.

Further, an HBO illumination can be coupled in via another beam splitter ST2 and a lens L.

Further, in a variant V1, a pulsed laser beam L2 for optical cutting and another laser beam L3 as optical tweezers are coupled in through corresponding correcting optics O1, O2 via the beam splitter ST2 and another beam splitter ST3.

Light can be coupled in, for example, by indirect in-coupling via lightguides followed by collimating optics.

The beam focus position of the respective laser in the specimen P is changed by displacing the optics or the ends of the light guides along the optical axis. In variant V1, the correcting optics O1, O2 are arranged so as to be displaceable along the optical axis via the control unit AS, wherein the control unit AS can match this displacing movement to the displacing movement of the objective. This is effected by means of an oppositely directed movement of at least one laser beam L3, which movement is adapted to the displacement of the objective via calculated or previously stored correction values. In this way, on the one hand, the position of the focus within the specimen can be changed in Z-direction in a defined manner; on the other hand, an object which is held by the optical tweezers can advantageously always remain at the same place in the specimen during displacements of the objective in Z-direction.

In addition to the movement of the optics O2 for laser L3, the optics O1 for the cutting laser L2 can also be moved in a corresponding manner and the position of the section can accordingly be selected in any manner, also so as to be decoupled from the position of the laser L3.

In the next variant V2, shared displaceable correcting optics O3 are provided for lasers L2, L3. In this case also, a decoupling of the movement of L2 and L3 can be achieved by means of different optics which can be additionally used in the beam path of laser L2.

Further, it is also possible to use multibeam tweezers, as they are called, i.e., tweezers in which one or more laser beams can be used to hold a plurality of objects. This can be carried out in that the laser beam L3 is directed to a plurality of objects by means of a scanner mirror at high frequency in such a way that these objects can be held simultaneously (C. Hoyer, S. Monajembashi, K. O. Greulich, "Laser Manipulation and UV induced single molecule reactions of individual DNA molecules", Journal of Biotechnology 52 (1996), 65–3).

Often organelles can not be imaged sharply because they move during image recording. Sharp three-dimensional images are possible only through the use of compensated optical tweezers which enable the organelles to be fixated while recording images. Thus, cell organelles, e.g., chloroplasts or mitochondria, can be fixated in living cells and imaged three-dimensionally in a sharp manner. Organelles which normally do not move, such as secretory vesicles or gravitational perception apparatus, can be deflected from their original position by the optical tweezers and the reaction of the cells (reorganization) can be examined three-dimensionally. By deflecting from the rest position, the cytoskeletal dynamics in living cells can also be examined.

Spheroids can be manipulated and examined three-dimensionally as in vivo models for tissues with z-compensated optical tweezers in the laser scanning microscope.

Living cells can be stained by vital dyes in such a way that they can be imaged by fluorescence microscopy. Accordingly, it is possible to examine chromosome organization in living cells with z-compensated optical tweezers integrated in a confocal laser scanning microscope. Three-dimensional images and examinations for the separation process in nonadherent cells is also possible with this arrangement.

While the foregoing description and drawings represent the present invention, it will be obvious to those skilled in the art that various changes may be made therein without departing from the true spirit and scope of the present invention.

What is claimed is:

1. An arrangement for coupling at least one beam of optical tweezers for trapping particles and/or a treatment beam into a microscope beam path in a laser scanning microscope, comprising:
   means for changing a position of the beam focus of the optical tweezers and/or of the treatment beam in a freely adjustable manner;
   wherein movable optics, which is separate from a microscope objective, are provided for changing the position of the beam focus of the optical tweezers and/or of the treatment beam and for in-coupling a scanning laser beam from the laser scanning microscope;
   wherein the change is controllable and causes a movement of the optical tweezers and/or of the treatment beam in the direction opposite to the movement of the microscope objective;
   the means for changing operable to control a displacement of the movable optics by previously stored or calculated values depending on the focal position of the microscope objective.

2. The arrangement according to claim 1, wherein a beam outlet and/or illumination optics of the optical tweezers and of the treatment beam are/is displaceable in the direction of the optical axis.

3. The arrangement according to claim 1, wherein there is provided a plurality of optical tweezers and/or treatment beams which are adjustable individually and/or jointly with respect to their focal position.

4. The arrangement of claim 1 wherein at least one electromechanical variable optical element performs a z-direction compensation of a displacement of an object plane so that an object being observed is fixed in position.

5. A laser scanning microscope and laser tweezer combination comprising:
   a laser scanning module with a pinhole optics and a detector;
   at least one laser tweezer module;
   a microscope objective operable to move in a z-direction relative to a specimen and positioned to receive light from the laser scanning module;
   tweezer optics, different from the microscope objective, for performing z-direction compensation and for focusing the laser tweezer beams from the laser tweezer module;
   a position control device that controls movement of the tweezer optics in an optical axis in the direction opposite to the movement of the microscope objective so as to perform the z-direction compensation according to previously stored values such that parts of the specimen are fixed regardless of the movement of the microscope objective in the z-direction.

* * * * *